(12) United States Patent
Okugawa et al.

(10) Patent No.: US 11,975,524 B2
(45) Date of Patent: May 7, 2024

(54) COLD PROTECTION MATERIAL AND METHOD FOR MANUFACTURING SAME

(71) Applicant: DEE LAB CO., LTD., Osaka (JP)

(72) Inventors: Takahiro Okugawa, Osaka (JP); Naoki Honda, Osaka (JP)

(73) Assignee: DEE LAB CO., LTD., Osaka (JP)

( * ) Notice: Subject to any disclaimer, the term of this patent is extended or adjusted under 35 U.S.C. 154(b) by 0 days.

(21) Appl. No.: 17/912,599

(22) PCT Filed: Sep. 28, 2020

(86) PCT No.: PCT/JP2020/036554
§ 371 (c)(1),
(2) Date: Sep. 19, 2022

(87) PCT Pub. No.: WO2022/064676
PCT Pub. Date: Mar. 31, 2022

(65) Prior Publication Data
US 2023/0146715 A1 May 11, 2023

(51) Int. Cl.
*B32B 7/05* (2019.01)
*B32B 3/18* (2006.01)
(Continued)

(52) U.S. Cl.
CPC .................. *B32B 7/05* (2019.01); *B32B 3/18* (2013.01); *B32B 5/026* (2013.01); *B32B 5/245* (2013.01);
(Continued)

(58) Field of Classification Search
None
See application file for complete search history.

(56) References Cited

U.S. PATENT DOCUMENTS

2017/0290378 A1 10/2017 Sekura
2018/0098588 A1 4/2018 Pezzimenti et al.
(Continued)

FOREIGN PATENT DOCUMENTS

CN 2056019 4/1990
CN 204605038 9/2015
(Continued)

OTHER PUBLICATIONS

Method For Producing Feather-Containing Product, Sep. 18, 2019, machine translation of JP6577688 (Year: 2019).*

(Continued)

*Primary Examiner* — Chinessa T. Golden
(74) *Attorney, Agent, or Firm* — Wenderoth, Lind & Ponack, L.L.P.

(57) ABSTRACT

A cold protection material includes an outer fabric, an inner fabric, two connecting members bonded to the outer fabric and the inner fabric so as to define a space between the outer fabric and the inner fabric, and a filler stored in the space. Each of the two connecting members has an outer surface bonded to the outer fabric and an inner surface bonded to the inner fabric, and has air permeability. Each of the two connecting members is made of a flexible material, and is configured not to be deformed so as to reduce a distance between the outer surface and the inner surface by a weight of the outer fabric or a weight of the inner fabric.

8 Claims, 7 Drawing Sheets

(51) Int. Cl.
  *B32B 5/02* (2006.01)
  *B32B 5/24* (2006.01)
  *B32B 37/10* (2006.01)
  *B32B 38/08* (2006.01)
(52) U.S. Cl.
  CPC .............. *B32B 37/10* (2013.01); *B32B 38/08* (2013.01); *B32B 2250/03* (2013.01); *B32B 2305/022* (2013.01); *B32B 2305/186* (2013.01); *B32B 2305/30* (2013.01); *B32B 2307/304* (2013.01); *B32B 2437/00* (2013.01)

(56) References Cited

U.S. PATENT DOCUMENTS

| | | | |
|---|---|---|---|
| 2020/0061969 | A1 | 2/2020 | Okanishi et al. |
| 2021/0204626 | A1 | 7/2021 | Pezzimenti et al. |

FOREIGN PATENT DOCUMENTS

| | | | |
|---|---|---|---|
| CN | 206085846 | | 4/2017 |
| CN | 107752155 | | 3/2018 |
| CN | 208228419 | | 12/2018 |
| CN | 109788813 | | 5/2019 |
| CN | 210116229 | | 2/2020 |
| CN | 111634087 | | 9/2020 |
| JP | 6-343541 | | 12/1994 |
| JP | 3011532 | | 5/1995 |
| JP | 8-103356 | | 4/1996 |
| JP | 2013-231254 | | 11/2013 |
| JP | 2013-256746 | | 12/2013 |
| JP | 2013256746 | A * | 12/2013 |
| JP | 3194872 | | 12/2014 |
| JP | 6226703 | | 11/2017 |
| JP | 6247431 | | 12/2017 |
| JP | 6577688 | | 9/2019 |
| JP | 6577688 | B1 * | 9/2019 |
| KR | 10-2020-0013545 | | 2/2020 |

OTHER PUBLICATIONS

Fukuyama, T., Fabric Having Ventilation Structure, Dec. 26, 2013, machine translation of JP2013-256746 (Year: 2013).*
International Search Report issued Dec. 1, 2020 in International (PCT) Application No. PCT/JP2020/036554.

* cited by examiner

COLD PROTECTION MATERIAL AND METHOD FOR MANUFACTURING SAME

TECHNICAL FIELD

The present invention relates to a cold protection material and a method for manufacturing the same.

BACKGROUND ART

Figure 10:
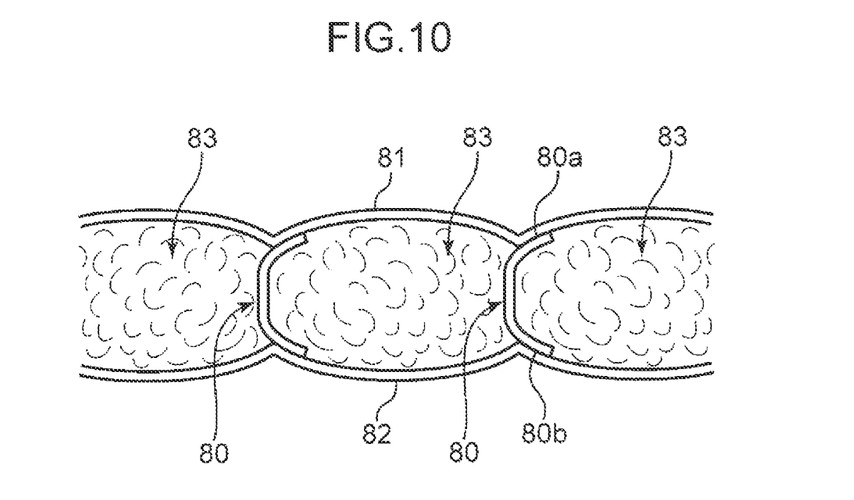
FIG. 10 is a view illustrating a conventional cold protection material.
Figure 11:
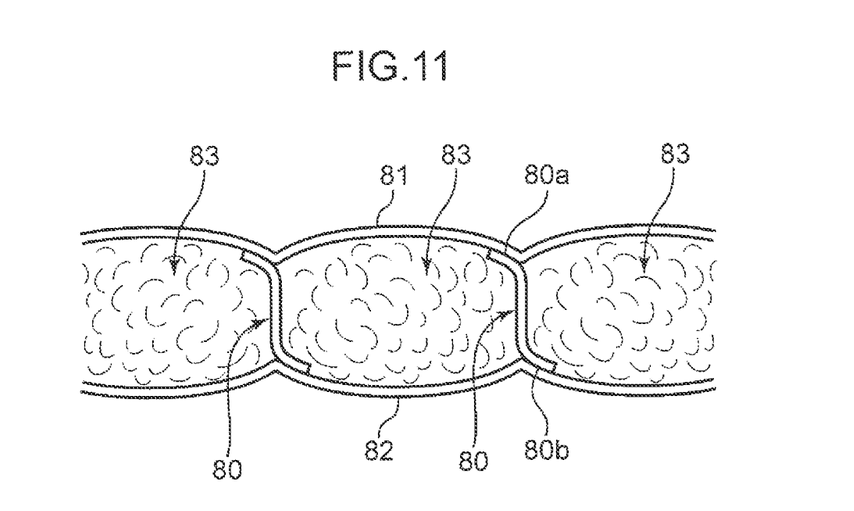
FIG. 11 is a view illustrating another conventional cold protection material.
Figure 12:
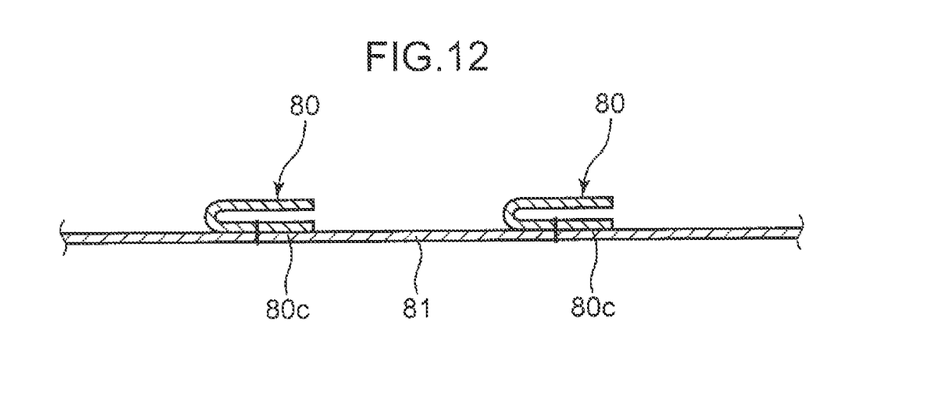
FIG. 12 is a view for describing a step of sewing a strip member to a first fabric.
Figure 13:
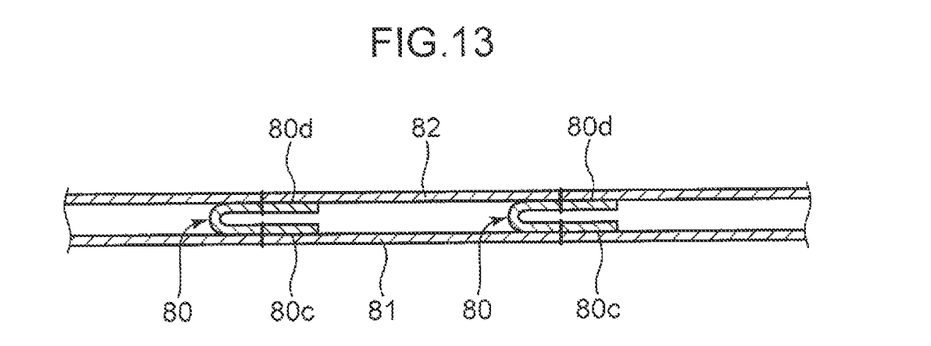
FIG. 13 is a view illustrating a state in which the strip member is sewn to the first fabric and a second fabric.

Conventionally, as disclosed Japanese Patent Nos. 6226703 and 6247431, a cold protection material used for a cold proof garment is known. Since this type of cold protection material has a configuration in which a filler such as down, feathers, or batting is filled in a space between a first fabric and a second fabric, a heat retaining property is secured. In order to form the space filled with the filler between the first fabric and the second fabric as described above, in the cold protection material disclosed Japanese Patent No. 6226703, a strip member 80 is used as illustrated in FIGS. 10 and 11. The strip member 80 has a predetermined width and is long in one direction, one edge portion 80*a* in a width direction is seamed to a first fabric 81, and the other edge portion 80*b* in the width direction is seamed to a second fabric 82. When seaming the strip member 80 to the first fabric 81 and the second fabric 82, first, the strip member 80 is folded into two at a center portion in the width direction as illustrated in FIG. 12, and in this state, an intermediate position of one folded portion 80*c* is sewn to the first fabric 81. Then, as illustrated in FIG. 13, the other folded portion 80*d* is sewn to the second fabric 82. Thereafter, a distance between the first fabric 81 and the second fabric 82 is increased, and a filler 83 is filled in a space formed between the fabrics 81 and 82. Note that although the strip member 80 is folded in a substantially U shape in FIG. 10, the strip member 80 may be folded in a substantially Z shape as illustrated in FIG. 11. In this case, the strip member 80 is sewn to the first fabric 81 and the second fabric 82 in a state of being folded into three in the width direction.

In the cold protection material disclosed in Japanese Patent No. 6247431, a strip member made of a mesh tape is folded into three in the width direction, and an adhesive tape is sewn to each of two end portions. Then, one adhesive tape is bonded to the first fabric, and the other adhesive tape is bonded to the second fabric. In this configuration, the strip member is folded in a substantially Z shape. However, since the strip member is bonded to the first fabric and the second fabric, no sewing hole is formed in the fabric. Therefore, it is possible to prevent the filler from protruding out through the sewing hole.

As described above, in the cold protection materials disclosed in Japanese Patent Nos. 6226703 and 6247431, the strip member is used, and when the filler is stored between the first fabric and the second fabric, an operation is necessary to deform the strip member so as to increase the distance between the first fabric and the second fabric. That is, the strip member is made of a material to be folded in the width direction so as to be sewn or bonded to the first fabric. Therefore, as illustrated in FIG. 13, in a state before the filler 83 is filled, a gap width between the first fabric 81 and the second fabric 82 is very narrow, and thus, in order to insert the filler 83 between the fabrics 81 and 82, an operation is necessary to increase the distance between the first fabric 81 and the second fabric 82.

CITATION LIST

Patent Literatures

Patent Literature 1: Japanese Patent No. 6226703
Patent Literature 2: Japanese Patent No. 6247431

SUMMARY OF INVENTION

An object of the present invention is to provide a cold protection material capable of reducing a workload when filling a filler between an outer fabric and an inner fabric.

The cold protection material according to an aspect of the present invention is a cold protection material used for a cold proof garment, including: an outer fabric constituting a front fabric of the cold proof garment or constituting a fabric disposed on a back side of the front fabric; an inner fabric disposed inside the outer fabric; two connecting members bonded to the outer fabric and the inner fabric to form a space between the outer fabric and the inner fabric; and a filler stored in the space. Each of the two connecting members has an outer surface bonded to the outer fabric and an inner surface bonded to the inner fabric, and has air permeability. Each of the two connecting members is formed of a flexible material, and is soft enough not to be deformed to reduce a distance between the outer surface and the inner surface by a weight of the outer fabric or the inner fabric.

A method for manufacturing the cold protection material according to the aspect of the present invention includes: placing two connecting members respectively at predetermined positions with an outer surface or an inner surface facing upward; placing one of an outer fabric and an inner fabric on the two connecting members placed at the predetermined positions; pressing the one of the outer fabric and the inner fabric from above to bond the one of the outer fabric and the inner fabric to the two connecting members; placing the one of the outer fabric and the inner fabric to which the two connecting members are bonded is placed on a press stand such that the two connecting members face up; bonding the other of the outer fabric and the inner fabric to the two connecting members bonded to the one of the outer fabric and the inner fabric; and inserting a filler into a space between the two connecting members that is the space between the outer fabric and the inner fabric.

As described above, according to the present invention, it is possible to reduce the workload when filling the filler between the outer fabric and the inner fabric.

DESCRIPTION OF EMBODIMENT

Hereinafter, an embodiment will be described with reference to the accompanying drawings. Note that the following embodiment is an example embodying the present invention, and is not intended to limit the technical scope of the present invention.

Figure 1:
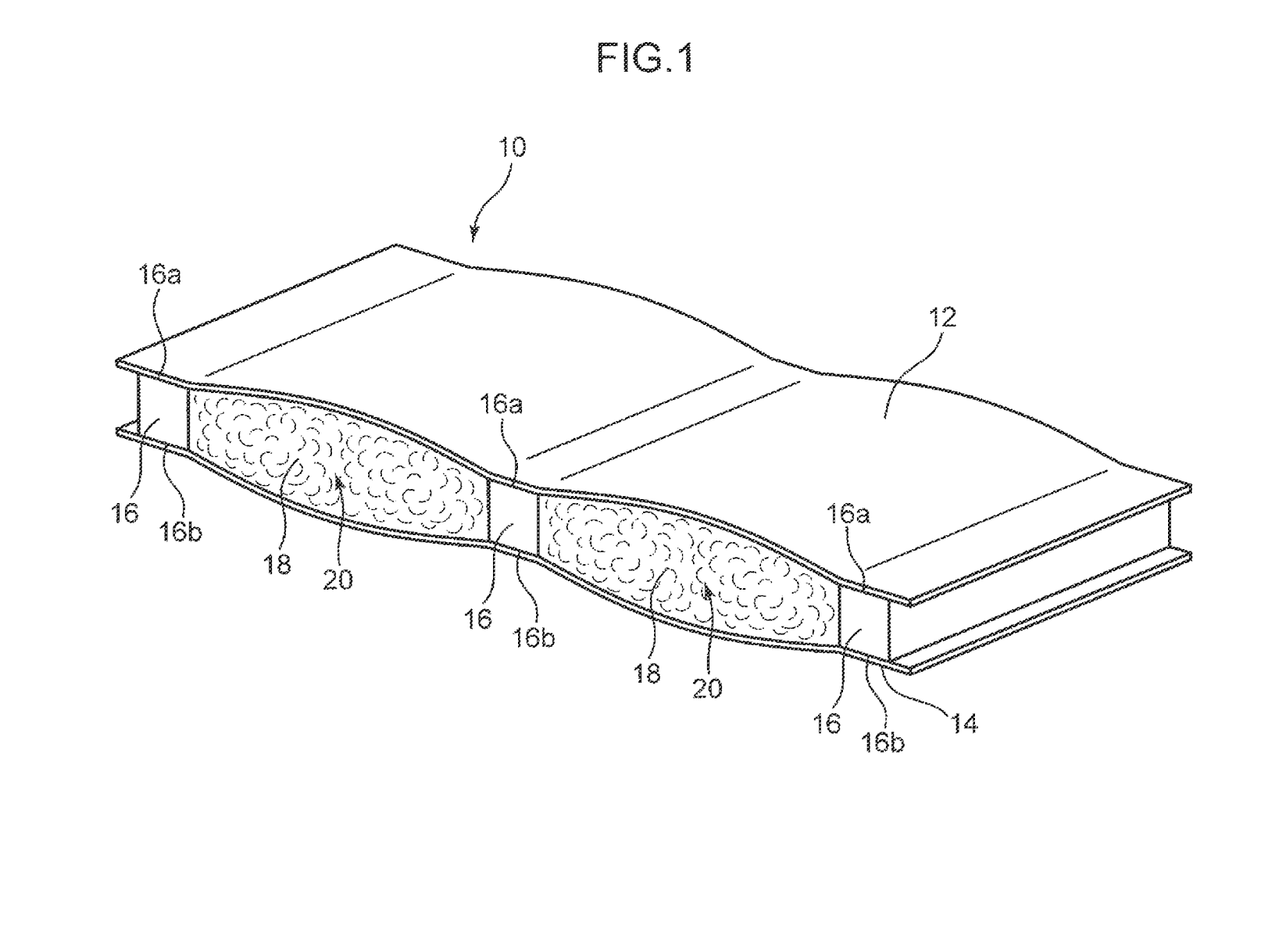
FIG. 1 is a perspective view of a cold protection material.
Figure 2:
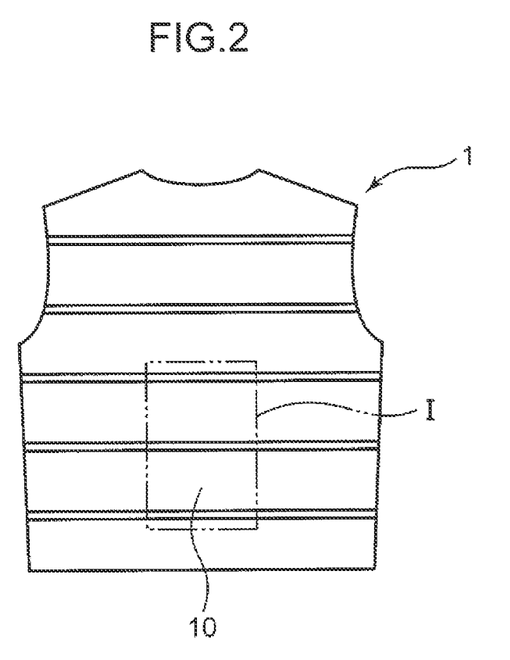
FIG. 2 is a view of a back body using the cold protection material.

A cold protection material 10 illustrated in FIG. 1 is a material used as an element of a cold proof garment having heat retaining property. The cold proof garment is, for example, a garment such as a jacket, a vest, pants, a coat, a blouson, or a parker, and is a garment excellent in heat retaining property. The cold protection material 10 may be configured as a back body 1 of the jacket, for example, as illustrated in FIG. 2. Note that FIG. 1 illustrates only a part of the cold protection material 10 constituting the back body 1. The cold protection material 10 may not be formed to constitute the back body 1, but may be formed to constitute a front body, a side body, a sleeve, a collar, and the like. The cold protection material 10 may be formed to constitute a rise or an inseam of the pants.

As illustrated in FIG. 1, the cold protection material 10 includes an outer fabric 12, an inner fabric 14, at least two connecting members 16 and 16, and a filler 18.

The outer fabric 12 may constitute a front fabric (an outer fabric) of the cold proof garment, and instead of this, may constitute a fabric disposed on a back side of the front fabric. The outer fabric 12 is made of synthetic fiber fabric having no air permeability or synthetic fiber fabric having almost no air permeability.

The inner fabric 14 is a fabric disposed inside the outer fabric 12, and is made of, for example, a back fabric of the cold proof garment. However, the inner fabric 14 may not be made of the back fabric of the cold proof garment. The inner fabric 14 may be made of, for example, a fabric located outside the back fabric in the cold proof garment (for example, when the cold proof garment has a four-layer structure, a fabric of the third layer from the outside).

Each of the two connecting members 16 and 16 is a member that connects the outer fabric 12 and the inner fabric 14, and is formed in a strip shape elongated in one direction. The two connecting members 16 and 16 extend linearly in a state of being arranged parallel to each other. However, the present embodiment is not limited to this form, and the connecting members 16 may be bent or may not be parallel to each other.

An outer surface 16a (that is, one of surfaces perpendicular to the one direction) of the connecting member 16 is bonded to the outer fabric 12. An inner surface 16b of the connecting member 16 facing a side opposite to the outer surface 16a is bonded to the inner fabric 14. The connecting member 16 and the outer fabric 12 are bonded by using a thermoplastic adhesive (hot melt), a solvent-based adhesive, a moisture curable adhesive, a UV curable adhesive, or an acrylic adhesive (adhesive that is not crosslinked). The connecting member 16 and the inner fabric 14 are also bonded in the same manner.

The two connecting members 16 and 16 are coupled to the outer fabric 12 and the inner fabric 14, so that a space 20 is formed by the outer fabric 12, the inner fabric 14, and the two connecting members 16 and 16. That is, the two connecting members 16 and 16 are members for forming a closed space 20 between the outer fabric 12 and the inner fabric 14.

Each connecting member 16 is formed of a flexible material. However, each connecting member 16 is soft enough not to be deformed to reduce a distance between the outer surface 16a and the inner surface 16b by the weight of the outer fabric 12 or the inner fabric 14. That is, since each connecting member 16 has strength enough not to be crushed or bent by the weight of the outer fabric 12 or the inner fabric 14, even when the space 20 is not filled with the filler 18, a distance between the outer fabric 12 and the inner fabric 14 in the vicinity of the connecting member 16 is not reduced.

Each connecting member 16 has air permeability. Therefore, since the air can pass through the connecting member 16, the air can flow into and out of the space 20 through the connecting member 16.

The filler 18 is stored in the space 20. The filler 18 is a material such as feathers, down, or cotton, and contributes to the cold protection material 10 exhibiting heat retaining property by being confined in the space 20.

Figure 3:
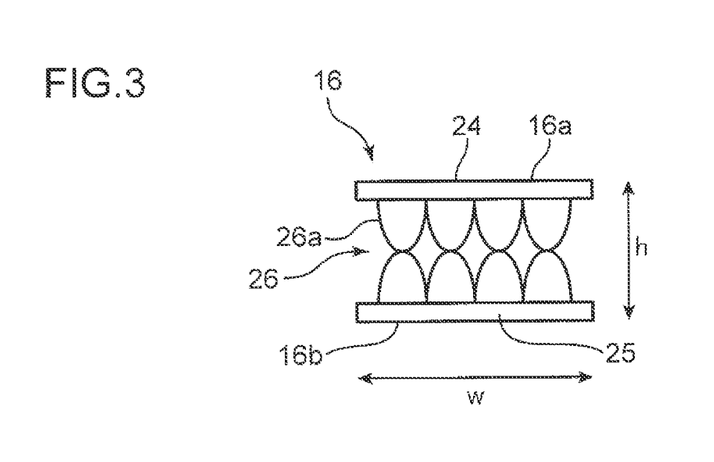
FIG. 3 is a schematic view of a connecting member constituting the cold protection material.

As illustrated in FIG. 3, each connecting member 16 is made of a double raschel knitted fabric. That is, the connecting member 16 is configured in a three-layer structure including a front fabric 24, a back fabric 25, and a ventilation layer 26. A front surface of the front fabric 24 forms the outer surface 16a of the connecting member 16, and a back surface of the back fabric 25 forms the inner surface 16b of the connecting member 16. The front surface of the front fabric 24 is bonded to the outer fabric 12, and the back surface of the back fabric 25 is bonded to the inner fabric 14. Then, the ventilation layer 26 is coupled to a back surface of the front fabric 24 and is coupled to a front surface of the back fabric 25. Note that the ventilation layer 26 may be bonded to the back surface of the front fabric 24 or may be bonded to the front surface of the back fabric 25.

Each of the front fabric 24 and the back fabric 25 may be made of, for example, a blended fabric (woven fabric) of nylon and polyurethane, or may be made of a polyester fabric (woven fabric). Further, the front fabric 24 and the back fabric 25 may be made of different fabrics.

The ventilation layer 26 is a portion that ensures air permeability in the connecting member 16, and is located between the front fabric 24 and the back fabric 25. The ventilation layer 26 is made of a knitted fabric 26a. The knitted fabric 26a is knitted into the front fabric 24 and the back fabric 25. Therefore, the front fabric 24 is not easily peeled off from the ventilation layer 26, and the back fabric 25 is also not easily peeled off from the ventilation layer 26.

Figure 4:
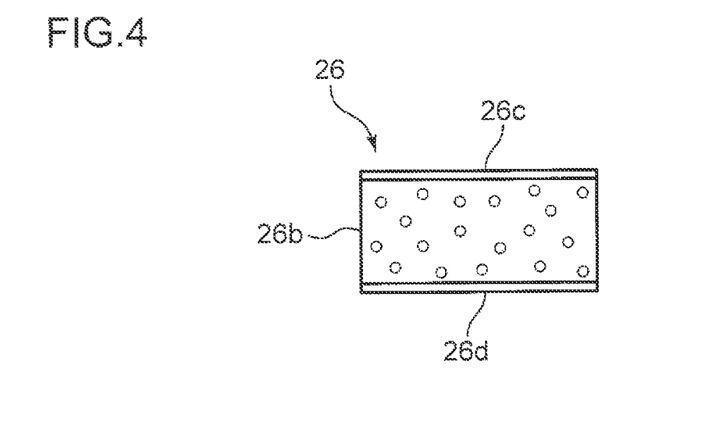
FIG. 4 is a modification of the connecting member.

Note that the ventilation layer 26 may be made of a foam 26b instead of the knitted fabric 26a. In this case, the ventilation layer 26 is made of the foam 26b having a rectangular parallelepiped shape, and the foam 26b is bonded to the front fabric 24 and the back fabric 25. Further, as illustrated in FIG. 4, laminate layers 26c and 26d may be respectively bonded to a front surface and a back surface of the foam 26b, the front fabric 24 may be bonded to the laminate layer 26c on the front side, and the back fabric 25 may be bonded to the laminate layer 26d on the back side.

Further, the ventilation layer 26 may be made of a woven fabric or a nonwoven fabric instead of the knitted fabric 26a.

When the ventilation layer 26 is made of a woven fabric, the woven fabric is preferably rougher than the front fabric 24 and the back fabric 25.

Each connecting member 16 has a width w in the lateral direction of 1 time or more and 5 times or less a width h in the height direction, and the width w in the lateral direction of 3 mm or more and 15 mm or less. However, the present embodiment is not limited to this size, and the connecting member 16 may have other sizes.

Figure 5:
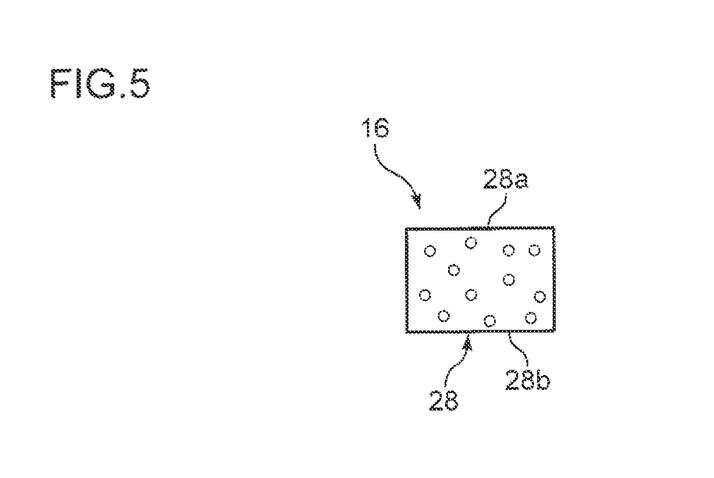
FIG. 5 is another modification of the connecting member.

Note that the connecting member 16 is not limited to a form made of a double raschel knitted fabric. For example, as illustrated in FIG. 5, the connecting member 16 may be made of a foam 28. The foam 28 is formed in a strip shape elongated in one direction, an outer surface 28a (that is, one of surfaces perpendicular to the one direction) is bonded to the outer fabric 12, and an inner surface 28b facing a side opposite to the outer surface 28a is bonded to the inner fabric 14.

Here, a method for manufacturing the cold protection material 10 will be described with reference to FIGS. 6 to 9. Here, a method of first bonding the connecting member 16 to the outer fabric 12 and then bonding the inner fabric 14 will be described. However, a method of first bonding the inner fabric 14 and then bonding the outer fabric 12 may also be performed. In this case, the method is different in that the order of use of the outer fabric 12 and the inner fabric 14 is reversed, but since other points are the same, descriptions thereof will be omitted here.

Figure 6:
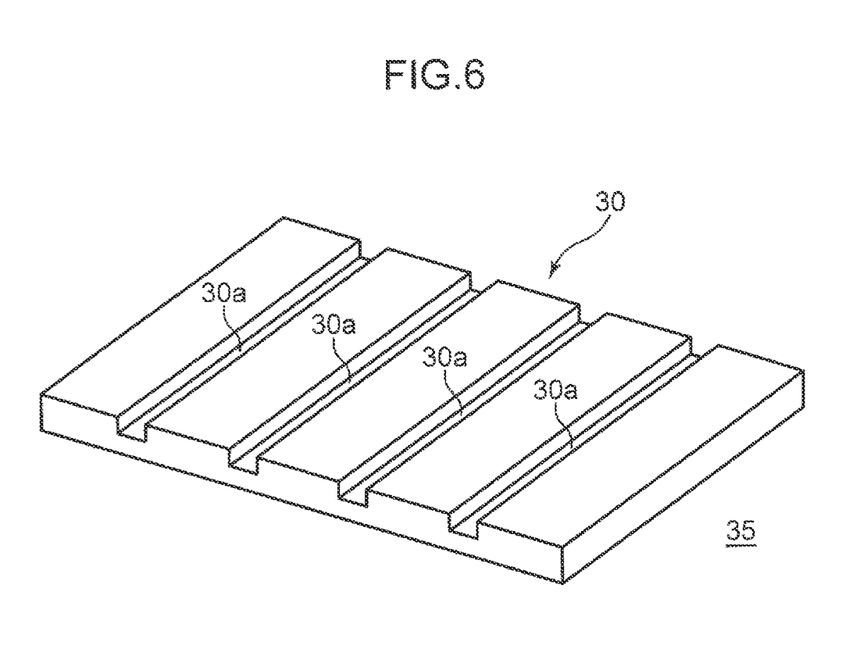
FIG. 6 is a perspective view of a receiving member used when the cold protection material is manufactured.

A receiving member 30 illustrated in FIG. 6 is used to manufacture the cold protection material 10. The receiving member 30 is made of, for example, a silicone mat, and at least two grooves 30a and 30a are formed on an upper surface of the receiving member 30. Each groove 30a has a shape suitable for the shape of the connecting member 16, and the grooves 30a and 30a are formed at a distance when the connecting members 16 and 16 are arranged on the outer fabric 12 and the inner fabric 14. The receiving member 30 is placed on a press stand 35.

Required number of connecting members 16 and 16 are respectively placed in the grooves 30a with the outer surface 16a facing upward. At this time, the outer surface 16a of the connecting member 16 protrudes upward from the upper surface of the receiving member 30. That is, a depth of the groove 30a of the receiving member 30 is less than the width h of the connecting member 16 in the height direction.

Figure 7:
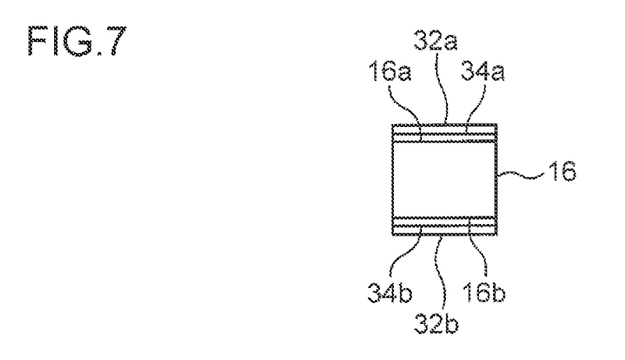
FIG. 7 is a view for describing the cold protection material in a state before being disposed in the receiving member.

As illustrated in FIG. 7, since release papers 32a and 32b are respectively attached to the outer surface 16a and the inner surface 16b of the connecting member 16, first, the release paper 32a adhering to the outer surface 16a is removed. Thus, an adhesive 34a adhering to the outer surface 16a of the connecting member 16 is exposed. Note that an operation of removing the release paper 32a on the outer surface 16a may be performed before the connecting member 16 is disposed in the groove 30a.

Figure 8:
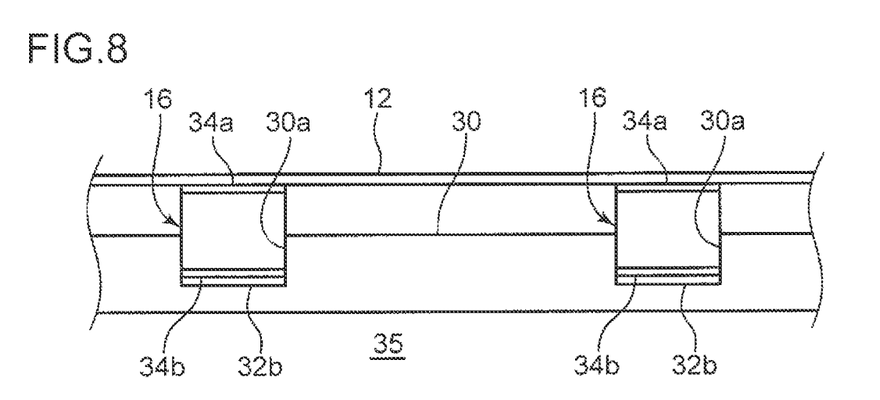
FIG. 8 is a view for describing a step of bonding the connecting member to an outer fabric.

Next, as illustrated in FIG. 8, the outer fabric 12 is placed on the connecting members 16 placed in the grooves 30a, and the outer fabric 12 is pressed from above by a pressing machine to bond the outer fabric 12 to the connecting members 16 and 16. At this time, depending on the type of the adhesive 34a, pressing is performed while heating. That is, a large number of connecting members 16 and 16 are collectively bonded to the outer fabric 12.

Figure 9:
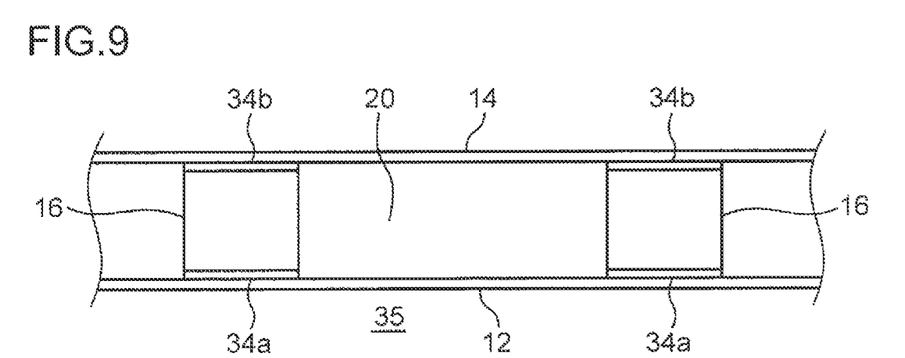
FIG. 9 is a view for describing a step of bonding the connecting member to an inner fabric.

When the connecting members 16 and 16 are bonded to the outer fabric 12, the connecting members 16 and 16 bonded to the outer fabric 12 are removed from the receiving member 30, and the outer fabric 12 is placed on the press stand 35 with the connecting members 16 and 16 positioning above the outer fabric 12. In this state, the release paper 32b attached to the inner surface 16b of the connecting member 16 is removed to expose the adhesive 34b, and in this state, as illustrated in FIG. 9, the inner fabric 14 is placed from above in alignment with a position of the outer fabric 12. At this time, although the filler 18 is not yet disposed in the space 20, even in this state, each connecting member 16 is not deformed so that the distance between the outer surface 16a and the inner surface 16b is reduced by the weight of the outer fabric 12 or the inner fabric 14. On the other hand, the outer fabric 12 or the inner fabric 14 bends due to its own weight so that the space 20 is recessed.

Then, the inner fabric 14 is pressed from above by the pressing machine to bond the inner fabric 14 to the connecting members 16 and 16. At this time, depending on the type of the adhesive 34b, pressing is performed while heating. That is, a large number of connecting members 16 and 16 are collectively bonded to the inner fabric 14. At this time, the connecting members 16 and 16 are deformed such that the outer fabric 12 and the inner fabric 14 approach each other by a pressing force by the pressing machine, but when the pressing force by the pressing machine is released, the connecting members 16 and 16 are restored to a shape before being pressed. Therefore, it is not necessary to deform the connecting member 16 so as to increase the distance between the outer surface 16a and the inner surface 16b.

In this regard, as in the conventional art illustrated in FIGS. 12 and 13, when the strip member 80 bent in a U shape is used, and a large number of strip members 80 are to be simultaneously bonded to the first fabric 81 or the second fabric 82 by using the pressing machine, the strip member 80 is creased and maintained in a U-shaped bent state. Therefore, the distance between the first fabric 81 and the second fabric 82 is almost eliminated. Therefore, an operation of increasing the distance between the first fabric 81 and the second fabric 82 is required. On the other hand, in order to prevent the strip member 80 from being creased, it is necessary to bond the strip members 80 to the first fabric 81 or the second fabric 82 one by one, which increases the number of steps for forming the space.

On the other hand, even if the connecting member 16 of the present embodiment is pressed when the connecting member 16 is bonded to the outer fabric 12 and the inner fabric 14, the connecting member 16 is then restored to a state of not being crushed by the weight of the outer fabric 12 or the inner fabric 14. Therefore, a large number of connecting members 16 can be bonded to the outer fabric 12 and the inner fabric 14 using the pressing machine.

Finally, the filler 18 is inserted into space 20 between outer fabric 12 and inner fabric 14. Thus, the cold protection material 10 is completed.

As described above, in the cold protection material 10 according to the present embodiment, in a state in which the filler 18 is not stored in the space 20 between the outer fabric 12 and the inner fabric 14, and the outer fabric 12 or the inner fabric 14 is placed on the two connecting members 16 and 16, the two connecting members 16 and 16 are not deformed so as to reduce the distance between the outer surface 16a and the inner surface 16b of the connecting members 16 and 16. That is, the shape of the two connecting members 16 and 16 when the filler 18 is not stored in the space 20 between the outer fabric 12 and the inner fabric 14 is maintained to be substantially the same as a shape when the filler 18 is stored in the space 20. Therefore, the distance between the outer fabric 12 and the inner fabric 14 in the vicinity of the connecting member 16 is secured at a height of the connecting members 16 and 16. Therefore, when filling the filler 18 into the space 20 between the outer fabric 12 and the inner fabric 14, an operation of deforming the shape of the connecting members 16 and 16 is not necessary. On the other hand, since the connecting members 16 and 16 are formed of a flexible material, when the cold protection material 10 is used for the cold proof garment, a situation hardly occurs in which a silhouette of the cold proof garment is impaired by the presence of the connecting members 16 and 16. In addition, since the connecting members 16 and 16 have air permeability, the air is allowed to enter and exit the space 20 in which the filler 18 is stored.

In the cold protection material 10, the ventilation layer 26 ensures that the air enters and exits the space 20 between the two connecting members 16 and 16. Further, since the connecting members 16 and 16 are bonded to the outer fabric 12 by the front fabric 24, an adhesive force between the connecting members 16 and 16 and the outer fabric 12 is secured. Furthermore, since the connecting members 16 and 16 are bonded to the inner fabric 14 by the back fabric 25, an adhesive force between the connecting members 16 and 16 and the inner fabric 14 is secured.

Further, since the ventilation layer 26 is made of a knitted fabric, the connecting members 16 and 16 easily ensure air permeability. Note that the knitted fabric constituting the ventilation layer 26 may be a warp knitted fabric or a tubular knitted fabric.

Further, since the knitted fabric is knitted into the front fabric 24 and the back fabric 25, peel strength between the front fabric 24 and the ventilation layer 26 is increased, and peel strength between the ventilation layer 26 and the back fabric 25 is also increased. As a result, connection strength between the outer fabric 12 and the inner fabric 14 is ensured.

Further, since each connecting member 16 is made of a double raschel knitted fabric, it is possible to ensure that the air enters and exits the space 20 through the connecting members 16 and 16. Moreover, since a bonding strength between the connecting members 16 and 16 and the outer fabric 12 and a bonding strength between the connecting members 16 and 16 and the inner fabric 14 can be ensured, a bonding strength between the outer fabric 12 and the inner fabric 14 can be ensured.

Further, since each connecting member 16 has the width w in the lateral direction of 1 time or more and 5 times or less the width h in the height direction, even when the connecting member 16 is bonded to the outer fabric 12 and the inner fabric 14 by pressing, it is possible to suppress folding of the connecting member 16. Furthermore, since the width w in the lateral direction of the connecting member 16 is 3 mm or more and 15 mm or less, a bonding area between each connecting member 16 and the outer fabric 12 and the inner fabric 14 can be secured.

It should be understood that the embodiment disclosed herein is illustrative in all respects and is not restrictive. The present invention is not limited to the embodiment, and various modifications, improvements, and the like can be made without departing from the gist of the present invention. For example, the cold protection material 10 may be made of a double face instead of the double raschel knitted fabric. The double face is a fabric obtained by seaming or bonding two fabrics to each other. In this case, at least one fabric is made of a fabric having good air permeability. The double face may be a double weave in which two fabrics are partially sewn together, or may be a structure in which two fabrics are bonded together with an adhesive such as a polyurethane resin adhesive.

Although the receiving member 30 is used to manufacture the cold protection material 10 of the embodiment, the present embodiment is not limited thereto. For example, if the plurality of connecting members 16 and 16 can be arranged side by side at predetermined positions on the press stand 35 by providing a mark or the like, the receiving member 30 need not be used.

In the embodiment, the large number of connecting members 16 and 16 are collectively bonded to the outer fabric 12, but instead of this, the large number of connecting members 16 and 16 may be bonded to the outer fabric 12 one by one. The same applies to a method of bonding the large number of connecting members 16 and 16 to the inner fabric 14.

Here, the embodiment will be outlined.

(1) The cold protection material according to the embodiment is a cold protection material used for a cold proof garment, including: an outer fabric constituting a front fabric of the cold proof garment or constituting a fabric disposed on a back side of the front fabric; an inner fabric disposed inside the outer fabric; two connecting members bonded to the outer fabric and the inner fabric to form a space between the outer fabric and the inner fabric; and a filler stored in the space. Each of the two connecting members has an outer surface bonded to the outer fabric and an inner surface bonded to the inner fabric, and has air permeability. Each of the two connecting members is formed of a flexible material, and is soft enough not to be deformed to reduce a distance between the outer surface and the inner surface by a weight of the outer fabric or the inner fabric.

In the cold protection material according to the embodiment, in a state in which the filler is not stored in the space between the outer fabric and the inner fabric, and the outer fabric or the inner fabric is placed on the two connecting members, the two connecting members are not deformed so as to reduce the distance between the outer surface and the inner surface of the connecting members. That is, the shape of the two connecting members when the filler is not stored in the space between the outer fabric and the inner fabric is maintained to be substantially the same as the shape when the filler is stored in the space. Therefore, since the distance between the outer fabric and the inner fabric is secured at the height of the connecting member, it is not necessary to deform the shape of the connecting member when filling the space between the outer fabric and the inner fabric with the filler. On the other hand, since the connecting members are formed of a flexible material, when the cold protection material is used for the cold proof garment, the situation hardly occurs in which the silhouette of the cold proof garment is impaired by the presence of the connecting members. In addition, since the two connecting members have air permeability, the air is allowed to enter and exit the space in which the filler is stored.

(2) Each of the two connecting members may be deformed by a pressing force of a pressing machine when the two connecting members are bonded to the outer fabric or the inner fabric, and may be configured to be restored to a shape before pressing when the pressing force by the pressing machine is released. In this aspect, even after the outer fabric and the inner fabric are pressed and bonded to the two connecting members using the pressing machine, the connecting members are not maintained in a deformed state so as to reduce the distance between the outer surface and the inner surface of the connecting member. Therefore, it is not necessary to deform the shape of the connecting member after pressing.

(3) Each of the two connecting members may include a front fabric forming the outer surface, a back fabric forming the inner surface, and a ventilation layer between the front fabric and the back fabric. In this aspect, the ventilation layer ensures that the air enters and exits the space between the two connecting members. Further, since the connecting member is bonded to the outer fabric by the front fabric, the adhesive force between the connecting member and the outer fabric is secured. Furthermore, since the connecting member is bonded to the inner fabric by the back fabric, the adhesive force between the connecting member and the inner fabric is secured.

(4) The ventilation layer may be made of a knitted fabric, a woven fabric, or a nonwoven fabric. When the ventilation layer is made of a knitted fabric or a nonwoven fabric, the connecting member easily ensures air permeability. On the other hand, when the ventilation layer is formed of a woven fabric, the woven fabric is preferably rougher than the front fabric and the back fabric.

(5) The knitted fabric may be knitted into the front fabric and the back fabric. In this aspect, the peel strength between the front fabric and the ventilation layer is increased, and the peel strength between the ventilation layer and the back fabric is also increased. As a result, the connection strength between the outer fabric and the inner fabric is ensured.

(6) The ventilation layer may be made of a foam. In this aspect, it is ensured that the air enters and exits the space through the connecting member. Note that the foam may be directly bonded to the front fabric and the back fabric, but the laminate layers may be respectively bonded to the front surface and the back surface of the foam, the front fabric may be bonded to the laminate layer on the front side, and the back fabric may be bonded to the laminate layer on the back side.

(7) Each of said two connecting members may be made of a double raschel knitted fabric. In this aspect, it is ensured that the air enters and exits the space through the connecting member. Moreover, since the bonding strength between the connecting member and the outer fabric and the bonding strength between the connecting member and the inner fabric can be ensured, the bonding strength between the outer fabric and the inner fabric can be ensured.

(8) Each of the two connecting members may be made of a foam. In this aspect, it is ensured that the air enters and exits the space through the connecting member.

(9) Each of the two connecting members may have a width in a lateral direction of 1 time or more and 5 times or less a width in a height direction, and the width in the lateral direction of 3 mm or more and 15 mm or less. In this aspect, since the width w in the lateral direction is 1 time or more and 5 times or less the width in the height direction, even when the connecting member is bonded to the outer fabric and the inner fabric by pressing, it is possible to suppress folding of the connecting member. Further, since the width of the connecting member in the lateral direction is 3 mm or more and 15 mm or less, the bonding area between the connecting member and the outer fabric and the inner fabric can be secured.

(10) A method for manufacturing the cold protection material includes: placing two connecting members respectively at predetermined positions with an outer surface or an inner surface facing upward; placing one of an outer fabric and an inner fabric on the two connecting members placed at the predetermined positions; pressing the one of the outer fabric and the inner fabric from above to bond the one of the outer fabric and the inner fabric to the two connecting members; placing the one of the outer fabric and the inner fabric to which the two connecting members are bonded is placed on a press stand such that the two connecting members face up; bonding the other of the outer fabric and the inner fabric to the two connecting members bonded to the one of the outer fabric and the inner fabric; and inserting a filler into a space between the two connecting members that is the space between the outer fabric and the inner fabric.

(11) The method for manufacturing the cold protection material may include: preparing a receiving member in which at least two grooves are formed on an upper surface of the receiving member; placing the two connecting members respectively in the two grooves with the outer surface or the inner surface facing upward; and placing the one of the outer fabric and the inner fabric on the two connecting members placed in the two grooves, and pressing the one of the outer fabric and the inner fabric from above to bond the one of the outer fabric and the inner fabric to the two connecting members.

The invention claimed is:

1. A cold protection material for a cold proof garment, the cold protection material comprising:
    an outer fabric configured to constitute a front fabric of the cold proof garment or a back fabric disposed on a back side of the front fabric;
    an inner fabric disposed inside the outer fabric;
    two connecting members bonded to the outer fabric and the inner fabric so as to define a space between the outer fabric and the inner fabric; and
    a filler stored in the space,
    wherein:
    each of the two connecting members has an outer surface bonded to the outer fabric and an inner surface bonded to the inner fabric, and has air permeability;
    each of the two connecting members is made of a flexible material, and is configured not to be deformed so as to reduce a distance between the outer surface and the inner surface by a weight of the outer fabric or a weight of the inner fabric;
    each of the two connecting members includes a front fabric defining the outer surface, a back fabric defining the inner surface, and a ventilation layer between the front fabric defining the outer surface and the back fabric defining the inner surface;
    the ventilation layer is made of a knit fabric;
    the knit fabric is knitted into the front fabric defining the outer surface and the back fabric defining the inner surface; and
    each of the two connecting members is made of a knit fabric.

2. The cold protection material according to claim 1, wherein each of the two connecting members is configured to be: (i) deformed by a pressing force of a pressing machine when the two connecting members are bonded to the outer fabric or the inner fabric; and (ii) restored to a shape before pressing when the pressing force by the pressing machine is released.

3. The cold protection material according to claim 1, wherein the knit fabric of each of the two connecting members is a double raschel knit fabric.

4. The cold protection material according to claim 1, wherein each of the two connecting members has a width in a lateral direction of 1 time or more and 5 times or less a height in a thickness direction, and the width in the lateral direction is 3 mm or more and 15 mm or less.

5. A method of manufacturing the cold protection material according to claim 1, the method comprising:

(a) placing the two connecting members at predetermined positions respectively, with the outer surface facing upward;
(b) placing the outer fabric on the two connecting members that are placed at the predetermined positions;
(c) pressing the outer fabric from above so as to bond the outer fabric to the two connecting members;
(d) placing the outer fabric, to which the two connecting members are bonded, on a press stand such that the two connecting members face up;
(e) bonding the inner fabric to the two connecting members that are bonded to the outer fabric; and
(f) inserting the filler into the space between the outer fabric and the inner fabric.

6. The method according to claim 5, further comprising:
preparing a receiving member in which two grooves are defined on an upper surface of the receiving member, wherein:
the placing (a) comprises placing the two connecting members in the two grooves, respectively, with the outer surface facing upward; and
the placing (b) comprises placing the outer fabric on the two connecting members that are placed in the two grooves.

7. A method of manufacturing the cold protection material according to claim 1, the method comprising:

(a) placing the two connecting members at predetermined positions, respectively, with the inner surface facing upward;
(b) placing the inner fabric on the two connecting members that are placed at the predetermined positions;
(c) pressing the inner fabric from above so as to bond the inner fabric to the two connecting members;
(d) placing the inner fabric, to which the two connecting members are bonded, on a press stand such that the two connecting members face up;
(e) bonding the outer fabric to the two connecting members that are bonded to the inner fabric; and
(f) inserting the filler into the space between the outer fabric and the inner fabric.

8. The method according to claim 7, further comprising:
preparing a receiving member in which two grooves are defined on an upper surface of the receiving member, wherein:
the placing (a) comprises placing the two connecting members in the two grooves, respectively, with the inner surface facing upward; and
the placing (b) comprises placing the inner fabric on the two connecting members that are placed in the two grooves.

* * * * *